United States Patent
Fujii et al.

(10) Patent No.: US 8,484,958 B2
(45) Date of Patent: Jul. 16, 2013

(54) EXHAUST TREATMENT DEVICE OF DIESEL ENGINE

(75) Inventors: Yasuo Fujii, Sakai (JP); Masanori Fujiwara, Sakai (JP); Katsushi Inoue, Sakai (JP); Yuuki Ishii, Sakai (JP); Kenta Mitamura, Sakai (JP); Noriyoshi Eguchi, Sakai (JP)

(73) Assignee: Kubota Corporation, Osaka (JP)

( * ) Notice: Subject to any disclaimer, the term of this patent is extended or adjusted under 35 U.S.C. 154(b) by 194 days.

(21) Appl. No.: 13/185,556

(22) Filed: Jul. 19, 2011

(65) Prior Publication Data

US 2012/0017573 A1 Jan. 26, 2012

(30) Foreign Application Priority Data

Jul. 20, 2010 (JP) .................................. 2010-162697

(51) Int. Cl.
*F01N 3/00* (2006.01)

(52) U.S. Cl.
USPC .................................. 60/295; 60/297; 60/311

(58) Field of Classification Search
USPC ..................................... 60/273, 295, 297, 311
See application file for complete search history.

(56) References Cited

U.S. PATENT DOCUMENTS 6,708,487 B2 * 3/2004 Morimoto et al. .............. 60/311
6,978,604 B2 * 12/2005 Wang et al. ..................... 60/297

FOREIGN PATENT DOCUMENTS

JP 04-086319 A 3/1992
JP 2005-113752 A 4/2005

* cited by examiner

*Primary Examiner* — Thomas Denion
*Assistant Examiner* — Philip Eklem
(74) *Attorney, Agent, or Firm* — Panitch Schwarze Belisario & Nadel LLP

(57) ABSTRACT

An object of the present invention is to provide the exhaust treatment device of a diesel engine which is capable of prohibiting the execution of DPF regenerating processing in a situation in which the DPF regenerating processing is inappropriate. In order to achieve the object, DPF regenerating mode switch manipulation means (7a) switches a DPF regenerating mode to a normal and acceleration coexistence regenerating mode (51) or an acceleration-sole regenerating mode (52), and DPF regenerating selection manipulation means (7b) switches a position to a normal regenerating permission position (53), a normal regenerating cancel position (54), or an acceleration regenerating execution position (55). When the DPF regenerating mode is in the acceleration-sole regenerating mode (52), the DPF regenerating control means prohibits normal regenerating processing by the DPF regenerating means irrespective of a position selected by the DPF regenerating selection manipulation means (7b).

8 Claims, 6 Drawing Sheets

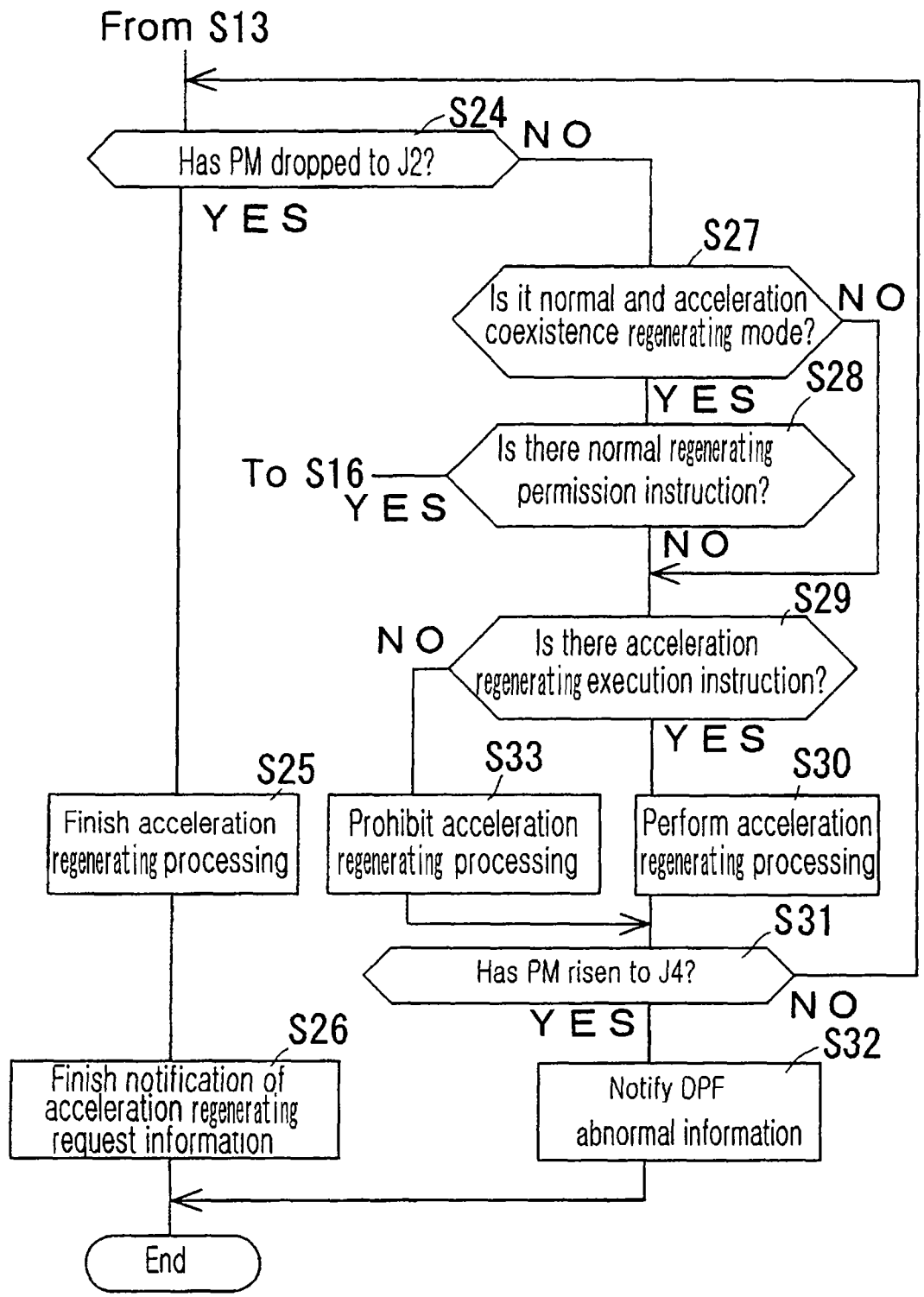

EXHAUST TREATMENT DEVICE OF DIESEL ENGINE

TECHNICAL FIELD

The present invention relates to the exhaust treatment device of a diesel engine and, more particularly, to the exhaust treatment device of a diesel engine which is capable of prohibiting the execution of DPF regenerating processing in a situation in which the DPF regenerating processing is inappropriate.

From among terms used in this specification and claims, the DPF means a Diesel Particulate Filter, a PM is Particle Material within exhaust, and a DOC means an oxidation catalyst.

BACKGROUND ART

There is a conventional exhaust treatment device of a diesel engine, including a DPF, PM accumulation detection means for detecting PM accumulated in the DPF, forced regenerating means, forced regenerating control means, and forced regenerating notification means (for example, refers to FIGS. 1 and 2 of Patent Document 1).

In the above conventional technique, when PM within exhaust is captured by the DPF and a PM accumulation detection value becomes a first state in which the detection value reaches a first set value, driving-time forced regenerating for operating the forced regenerating means when a vehicle travels automatically starts and continues to combust and eliminate the PM. When the PM accumulation detection value further rises to become a second state in which the detection value reaches a second set value higher than the first set value because the PM is not combusted and eliminated by the driving-time forced regenerating, necessity to execute stopping-time forced regenerating for regenerating the forced regenerating means when the vehicle stops by operating the forced regenerating notification means is notified.

However, the above conventional technique is problematic in that it does not have a method of prohibiting the driving-time forced regenerating which automatically starts and continues.

PRIOR ART DOCUMENT

Patent Document

Patent Document 1: Japanese Patent Laid-Open Publication No. 2005-113752

DISCLOSURE

Technical Problem

<<Problem>> The execution of DPF regenerating processing cannot be prohibited in a situation in which the DPF regenerating processing is inappropriate.

Since there is no method of prohibiting the driving-time forced regenerating which automatically starts and continues, the execution of the driving-time forced regenerating cannot be prohibited by a driver's intention. Accordingly, in a situation in which the DPF regenerating processing is inappropriate, such as a situation in which an exhaust temperature or the concentration of exhaust hazardous ingredients is needed to maintain a low level, the execution of the DPF regenerating processing cannot be prohibited.

An object of the present invention is to provide the exhaust treatment device of a diesel engine which is capable of prohibiting the execution of DPF regenerating processing in a situation in which the DPF regenerating processing is inappropriate.

Technical Solution

A specific aspect of an invention according to claim 1 is as follows.

As illustrated in FIG. 1, the exhaust treatment device of a diesel engine includes a DPF 1, PM accumulation estimation means 2 for PM accumulated in the DPF 1, DPF regenerating means 3, DPF regenerating control means 4, memory means 5, acceleration regenerating request information notification means 6, DPF regenerating mode switch manipulation means 7a, and DPF regenerating selection manipulation means 7b, wherein an acceleration regenerating request determination value J2 and a normal regenerating start determination value J3 are stored in the memory means 5.

As illustrated in FIG. 2, the DPF regenerating mode switch manipulation means 7a switches a DPF regenerating mode to a normal and acceleration coexistence regenerating mode 51 or an acceleration-sole regenerating mode 52, and the DPF regenerating selection manipulation means 7b switches a position to a normal regenerating permission position 53, a normal regenerating cancel position 54, or an acceleration regenerating execution position 55.

Furthermore, if the DPF regenerating mode is in the normal and acceleration coexistence regenerating mode 51 and the normal regenerating permission position 53 is selected, after a PM accumulation estimation value rises to the normal regenerating start determination value J3, the DPF regenerating control means 4 automatically controls the DPF regenerating means 3 so that the DPF regenerating means 3 starts executing (S4) normal regenerating processing, thereby raising a temperature of exhaust 11 passing through the DPF 1, as illustrated in FIG. 3.

When the PM accumulation estimation value is the acceleration regenerating request determination value J2 or higher in determining a subsequent acceleration regenerating request, the DPF regenerating control means 4 controls the acceleration regenerating request information notification means 6 so that the acceleration regenerating request information notification means 6 notifies (S11) acceleration regenerating request information.

Next, if the acceleration regenerating execution position 55 is selected in the normal and acceleration coexistence regenerating mode 51, the DPF regenerating control means 4 controls the DPF regenerating means 3 so that the DPF regenerating means 3 switches (S13) the normal regenerating processing to acceleration regenerating processing, thereby raising the temperature of the exhaust 11 passing through the DPF 1 and accelerating a regenerating speed of the DPF 1 as compared with the normal regenerating processing.

Furthermore, if the normal regenerating cancel position 54 is selected while the normal regenerating processing is executed (S4, S16) in the normal and acceleration coexistence regenerating mode 51, the DPF regenerating control means 4 cancels the execution (S4, S16) of the normal regenerating processing by the DPF regenerating means 3 and prohibits (S8) the execution of the normal regenerating processing.

Furthermore, if the DPF regenerating mode illustrated in FIG. 2 is in the acceleration-sole regenerating mode 52, the DPF regenerating control means 4 prohibits (S8) the normal regenerating processing by the DPF regenerating means 3, irrespective of a position selected by the DPF regenerating selection manipulation means 7b, and when the PM accumulation estimation value is the acceleration regenerating request determination value J2 or higher in determining the acceleration regenerating request, the DPF regenerating control means 4 controls the acceleration regenerating request information notification means 6 so that the acceleration regenerating request information notification means 6 notifies (S11) the acceleration regenerating request information.

Next, if the acceleration regenerating execution position 55 is selected in the acceleration-sole regenerating mode 52, the DPF regenerating control means 4 starts the acceleration regenerating processing.

Next, when the selection of the acceleration regenerating execution position 55 is released in the acceleration-sole regenerating mode 52, the DPF regenerating control means 4 prohibits (S33) the acceleration regenerating processing by the DPF regenerating means 3.

Advantageous Effects (Invention According to Claim 1)

An invention according to claim 1 has the following effect.

<<Effect>> The execution of DPF regenerating processing can be prohibited in a situation in which the DPF regenerating processing is inappropriate.

As illustrated in FIG. 3, when the normal regenerating cancel position 54 is selected while the normal regenerating processing is executed (S4, S16) in the normal and acceleration coexistence regenerating mode 51, the DPF regenerating control means 4 cancels the execution (S4, S16) of the normal regenerating processing by the DPF regenerating means 3 and continues to prohibit (S8) the execution of the normal regenerating processing. When the DPF regenerating mode is in the acceleration-sole regenerating mode 52, the DPF regenerating control means 4 prohibits (S8) the normal regenerating processing by the DPF regenerating means 3, irrespective of a position selected by the DPF regenerating selection manipulation means 7b. The execution of normal regenerating processing which automatically starts and continues can be prohibited by a driver's intention. Accordingly, in a situation in which DPF regenerating processing is inappropriate, such as a situation in which an exhaust temperature or the concentration of exhaust hazardous ingredients is needed to maintain a low level, the execution of the DPF regenerating processing can be prohibited.

<<Effect>> In the acceleration-sole regenerating mode, a driver is freed from difficulty in determining normal regenerating permission or normal regenerating cancel.

When the DPF regenerating mode illustrated in FIG. 2 is in the acceleration-sole regenerating mode 52, the DPF regenerating control means 4 prohibits (S8) the normal regenerating processing by the DPF regenerating means 3, irrespective of a position selected by the DPF regenerating selection manipulation means 7b. Accordingly, a driver is free from difficulty in determining normal regenerating permission or normal regenerating cancel because normal regenerating processing is always prohibited in the acceleration-sole regenerating mode 52.

<<Effect>> A DPF regenerating mode can be selected according to a situation in which kinds of machines having an engine mounted thereon are used.

As illustrated in FIG. 2, the normal and acceleration coexistence regenerating mode 51 in which the execution or cancel of the normal regenerating processing can be selected and the acceleration-sole regenerating mode 52 in which the normal regenerating processing is always prohibited can be switched. Accordingly, a DPF regenerating mode can be selected according to a situation in which kinds of machines having an engine mounted thereon are used.

(Invention According to Claim 2)

An invention according to claim 2 has the following effect in addition to the effect of the invention according to claim 1.

<<Effect>> A degradation of fuel efficiency (fuel consumption) or a reduction in the output can be suppressed.

As illustrated in FIG. 3, when the DPF regenerating mode is in the normal and acceleration coexistence regenerating mode 51, the DPF regenerating control means 4 automatically starts executing (S4) the normal regenerating processing after the PM accumulation estimation value rises up to the normal regenerating start determination value J3. However, even though the PM accumulation estimation value remains around the normal regenerating start determination value J3 because of a reason, such as competition of the PM combustion removal speed and the PM accumulation speed, the acceleration regenerating request information is notified (S11) when the acceleration regenerating request is determined (T3) after the determination reservation period T1 of the acceleration regenerating request elapses. Accordingly, a degradation of fuel efficiency (fuel consumption) or a reduction in the output due to prolonged normal regenerating processing can be suppressed because the normal regenerating processing can be rapidly switched (S13) to the acceleration regenerating processing.

(Invention According to Claim 3)

An invention according to claim 3 has the following effect in addition to the effect of the invention according to claim 2.

<<Effect>> Prolonged normal regenerating processing after the determination reservation period of an acceleration regenerating request elapses can be suppressed.

As illustrated in FIG. 3, when the DPF regenerating mode is in the normal and acceleration coexistence regenerating mode 51, during the re-determination period T2 of an acceleration regenerating request, the DPF regenerating control means 4 finishes (S19) the normal regenerating processing or notifies (S11) the acceleration regenerating request information. Accordingly, prolonged normal regenerating processing after the determination reservation period T1 of the acceleration regenerating request elapses can be suppressed.

(Invention According to Claim 4)

An invention according to claim 4 has the following effect in addition to the effects of the invention according to claims 1 to 3.

<<Effect>> Prolonged acceleration regenerating processing can be suppressed.

As illustrated in FIG. 3, when a PM accumulation estimation value drops to the acceleration regenerating request determination value J2 which is the lowest limit value of an acceleration regenerating request, the DPF regenerating control means 4 finishes (S25) the acceleration regenerating processing. Accordingly, prolonged acceleration regenerating processing can be continuously suppressed.

In this case, although the acceleration regenerating processing is finished (S25), the PM accumulation estimation value drops to the lowest limit value of the acceleration regenerating request. Accordingly, the clogging of the DPF 1 can be significantly solved, and a decrease in the output due to increased back pressure can be suppressed to some extent. Consequently, the operation of an engine after the acceleration regenerating processing is finished (S25) is not hindered.

(Invention According to Claim 5)

An invention according to claim 5 has the following effect in addition to the effect of the invention according to any one of claims 1 to 4.

<<Effect>> The execution of an emergency measure can be awakened.

As illustrated in FIG. 3, when the PM accumulation estimation value rises up to the DPF abnormal determination value J4, the DPF regenerating control means 4 starts notifying (S32) DPF abnormal information through the DPF abnormal information notification means 8. Accordingly, if abnormal PM accumulation, etc. is generated, necessity to take an emergency measure, such as an engine stop or DPF cleaning processing in a maintenance factory, can be awakened.

(Invention According to Claim 6)

An invention according to claim 6 has the following effect in addition to the effect of the invention according to any one of claims 1 to 5.

<<Effect>> Prolonged normal regenerating processing can be suppressed.

As illustrated in FIG. 3, in the case where the DPF regenerating mode is in the normal and acceleration coexistence regenerating mode 51, when the PM accumulation estimation value drops to the normal regenerating end determination value J1 owing to normal regenerating processing, the DPF regenerating control means 4 finishes (S7, S19) the normal regenerating processing. Accordingly, prolonged normal regenerating processing can be suppressed.

(Invention According to Claim 7)

An invention according to claim 7 has the following effect in addition to the effect of the invention according to any one of claims 1 to 6.

<<Effect>> Acceleration regenerating processing does not hinder the traveling of a machine having an engine mounted thereon or a task for the machine.

The normal regenerating processing is performed during the operation of a machine having an engine mounted thereon, in which at least one of the traveling of the machine and a task for the machine is performed, and the acceleration regenerating processing is performed during the stop of a machine having an engine mounted thereon, in which both the traveling of the machine and a task for the machine are stopped. Accordingly, the acceleration regenerating processing does not hinder the traveling of the machine having an engine mounted thereon or the task for the machine.

(Invention According to Claim 8)

An invention according to claim 8 has the following effect in addition to the effect of the invention according to any one of claims 1 to 7.

<<Effect>> The DPF can be regenerated by a combination of the common rail system and the DOC.

As shown in FIG. 1, the DPF 1 can be regenerated by a combination of the common rail system 9 and the DOC 10.

DESCRIPTION OF DRAWINGS

FIG. 6 shows a portion continued from step S13 in the flowchart shown in FIG. 4.

MODE FOR INVENTION

FIGS. 1 to 6 are diagrams illustrating the exhaust treatment device of a diesel engine according to an embodiment of the present invention. In the present embodiment, the exhaust treatment device of a multi-cylinder diesel engine is described.

Figure 1:
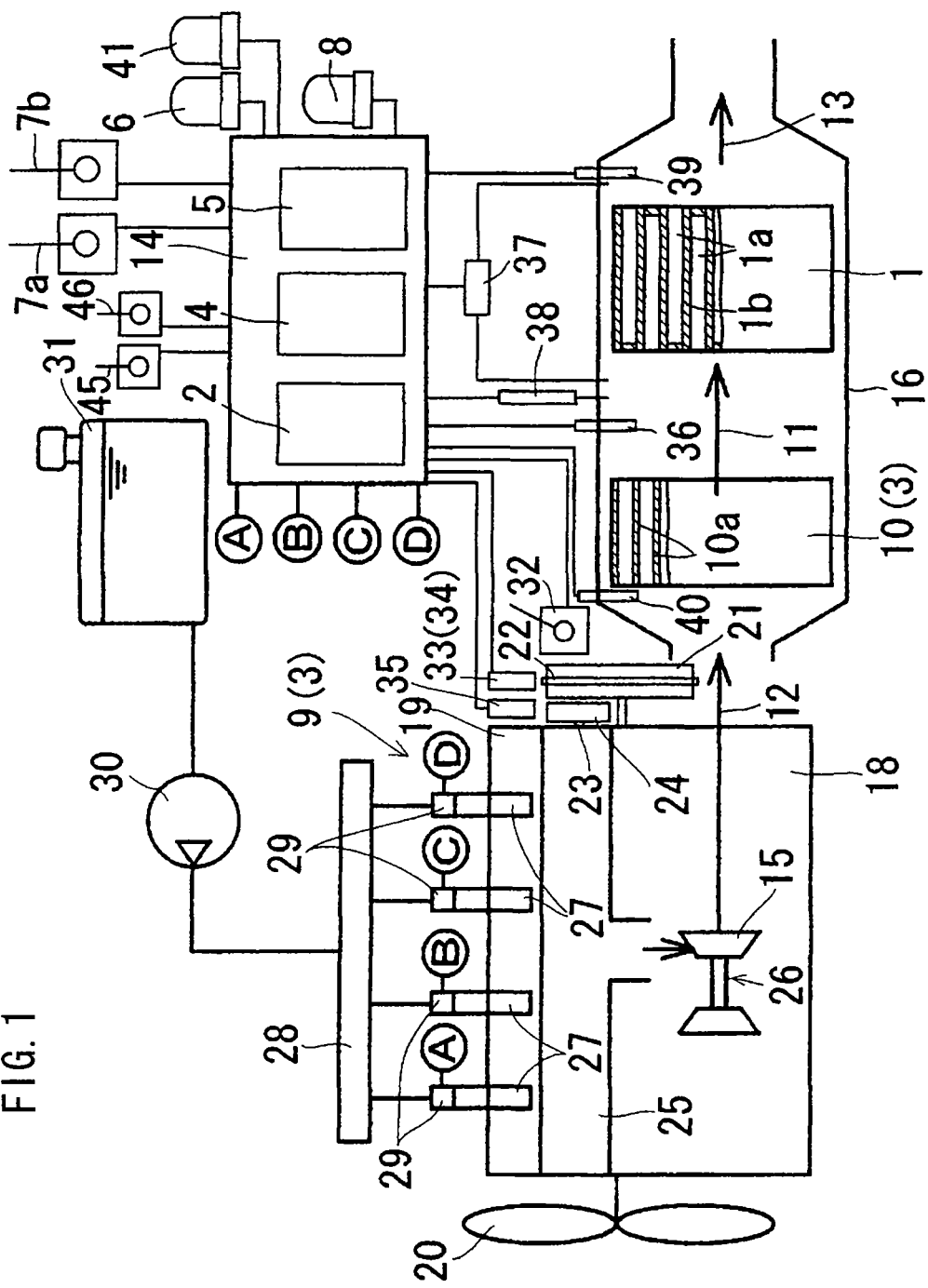
FIG. 1 is a diagram showing the exhaust treatment device of a diesel engine according to an embodiment of the present invention.

An outline of the diesel engine shown in FIG. 1 is described below.

A cylinder head 19 is assembled over a cylinder block 18. An engine cooling fan 20 is disposed in the front part of the cylinder block 18, and a fly wheel 21 is disposed in the rear part of the cylinder block 18. A rotor plate 22 is mounted on the fly wheel 21. Furthermore, a sensor plate 24 is mounted on an actuation valve camshaft 23 and disposed in the rear part of the cylinder block 18. An exhaust manifold 25 is disposed on one side of the cylinder head 19. A supercharger 26 is communicating with the exhaust manifold 25. A DPF casing 16 having a DPF 1 accommodated therein is disposed downstream of the turbine 15 of the supercharger 26. The DPF casing 16 also accommodates a DOC 10. An injector 27 for each cylinder is disposed in the cylinder head 19. The injectors 27 are coupled to a common rail 28. Electromagnetic valves 29 are installed in the respective injectors 27. A fuel tank 31 is coupled to the common rail 28 through a fuel supply pump 30.

Target engine RPM setting means 32, actual engine RPM detection means 33, crank angle detection means 34, and cylinder determination means 35 are associated with the electromagnetic valves 29 of the injectors 27 through control means 14. The target engine RPM setting means 32 is a potentiometer for outputting a target engine RPM based on a position, set by a governor lever, as a voltage value. The actual engine RPM detection means 33 and the crank angle detection means 34 are pickup coils abutting on the outer circumference of the rotor plate 22 and are configured to detect an actual engine RPM and a crank angle, respectively, by detecting the number of sawteeth installed on the outer circumference of the rotor plate 22 at regular intervals. The cylinder determination means 35 is a sensor for determining that the combustion cycle of each cylinder is placed in which stroke by detecting projections formed in the sensor plate 24. The control means 14 is an engine ECU. The ECU is an abbreviation of an electronic control unit.

The control means 14 controls the opening valve timing and the opening valve continuation time of the electromagnetic valves 29 of the injectors 27 so that a predetermined amount of fuel is injected from the injectors 27 to the combustion chamber on predetermined injection timing in the state in which deviation between a target engine RPM and an actual engine RPM is small.

The construction of the exhaust treatment device is described below.

As shown in FIG. 1, the exhaust treatment device is equipped with the DPF 1, PM accumulation estimation means 2 for PM accumulated in the DPF 1, DPF regenerating means 3, DPF regenerating control means 4, memory means 5, acceleration regenerating request information notification means 6, DPF regenerating mode switch manipulation means 7a, and DPF regenerating selection manipulation means 7b.

The DPF 1 is a honeycomb catalyst support made of ceramics and is a wall flow monolith configured to have the end portions of adjacent cells 1a alternately clogged. Exhaust 11 passes through the inside of the cells 1a and the wall 1b of the cells 1a, and the PM is captured at the wall 1b of the cells 1a.

The PM accumulation estimation means 2 is a predetermined operation unit of the engine ECU (that is, the control means 14) and is configured to estimate the amount of PM accumulation from previously and experimentally obtained map data on the basis of an engine load, an engine RPM, an exhaust temperature detected by an exhaust temperature sensor 36 at the upstream side of the DPF 1, exhaust pressure at the upstream side of the DPF 1 detected by the exhaust pressure sensor 38 at the upstream side of the DPF 1, and a difference in the pressure on the upstream and downstream sides of the DPF 1 which is detected by the differential pressure sensor 37.

The DPF regenerating means 3 consists of a combination of the common rail system 9 and the DOC 10 disposed on the upstream side of the DPF 1. In normal regenerating processing and acceleration regenerating processing, the DPF regenerating means 3 oxidizes and combusts non-combustion fuel through oxygen within exhaust using the DOC 10 by mixing the non-combustion fuel with the exhaust through a post injection subsequent to a main injection performed by the injectors 27 of the common rail system 9, thereby raising the temperature of the exhaust 11 passing through the DPF 1.

The DOC 10 is a ceramic honeycomb catalyst support. The DOC 10 is configured to contain an oxidization catalyst and to have a flow through structure having both ends of the cells 10a opened. The DOC 10 is configured to have the exhaust 12 pass through the inside of the cells 10a.

When a temperature of the exhaust 12 at the upstream side of the DOC 10, detected by the exhaust temperature sensor 40 at the upstream side of the DOC 10, is lower than an activation temperature of the DOC 10, the DPF regenerating control means 4 controls the injectors 27 of the common rail system 9 so that it performs an after injection later than a main injection and earlier than a subsequent post injection or closes the degree of opening of an intake throttle and raises the temperature of the exhaust 12, thereby attempting to activate the DOC 10.

When a temperature of the exhaust 13 at the downstream side of the DPF 1, detected by the exhaust temperature sensor 39 at the downstream side of the DPF 1, is higher than a predetermined abnormal determination temperature, the DPF regenerating control means 4 controls the DPF abnormal information notification means 8 so that it starts notifying DPF abnormal information and, at the same time, stops post injection or reduces the amount of injection of the post injection.

The DPF regenerating means 3 may have a combination of the DOC 10 and the injectors for injecting fuel into the exhaust tube or may have an electric heater disposed at the entrance of the DPF 1.

The DPF regenerating control means 4 is installed in the engine ECU which is the control means 14.

The memory means 5 is memory installed in the engine ECU which is the control means 4.

Figure 3:
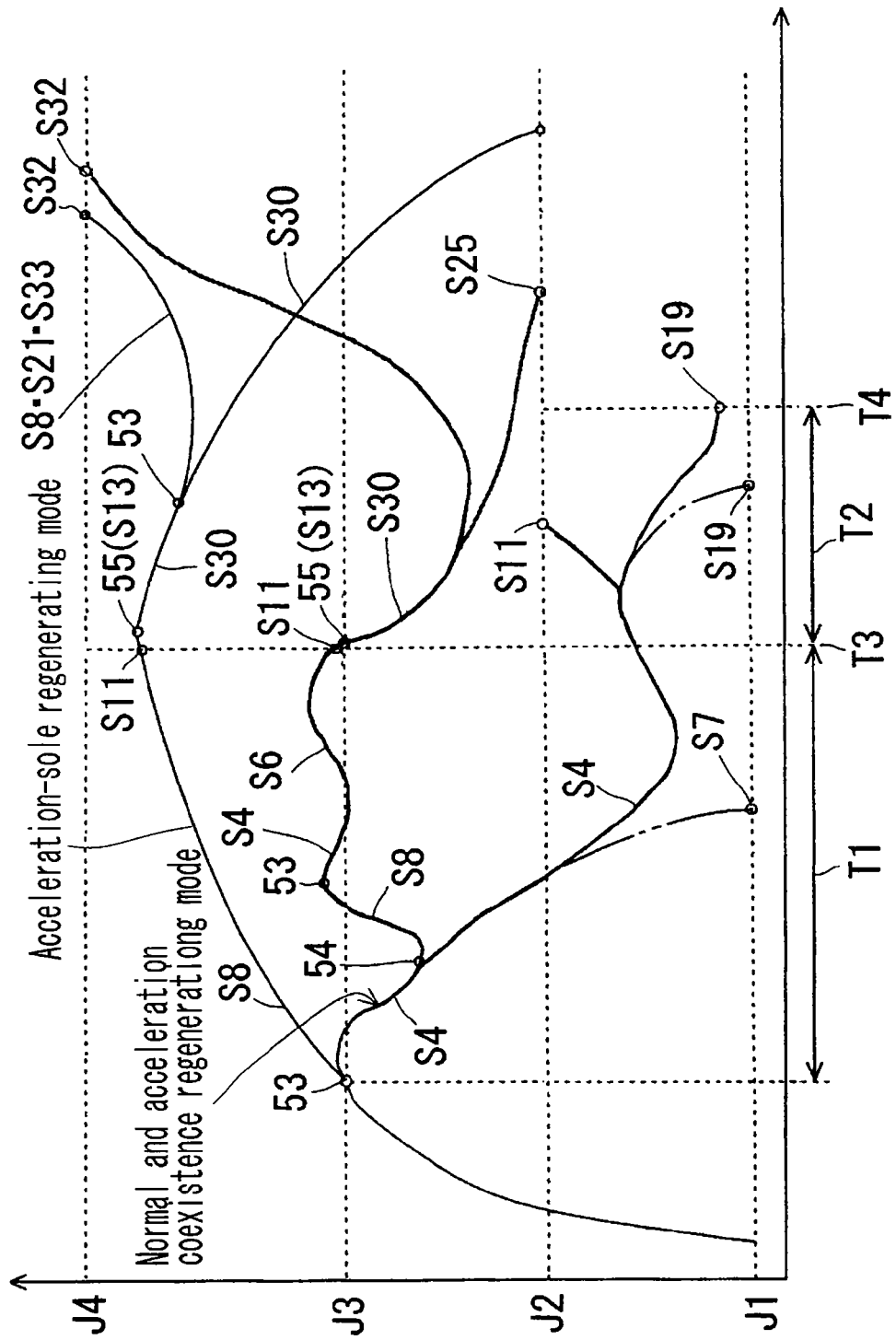
FIG. 3 is a timing chart illustrating DPF regenerating processing using the exhaust treatment device of a diesel engine according to an embodiment of the present invention.

A plurality of determination values J1, J2, and J3 regarding a PM accumulation estimation value and the determination reservation period T1 of an acceleration regenerating request are stored in the memory means 5. As shown in FIG. 3, the plurality of determination values J1, J2, and J3 sequentially includes a normal regenerating end determination value J1, an acceleration regenerating request determination value J2, and a normal regenerating start determination value J3 from a lower value.

Figure 2:
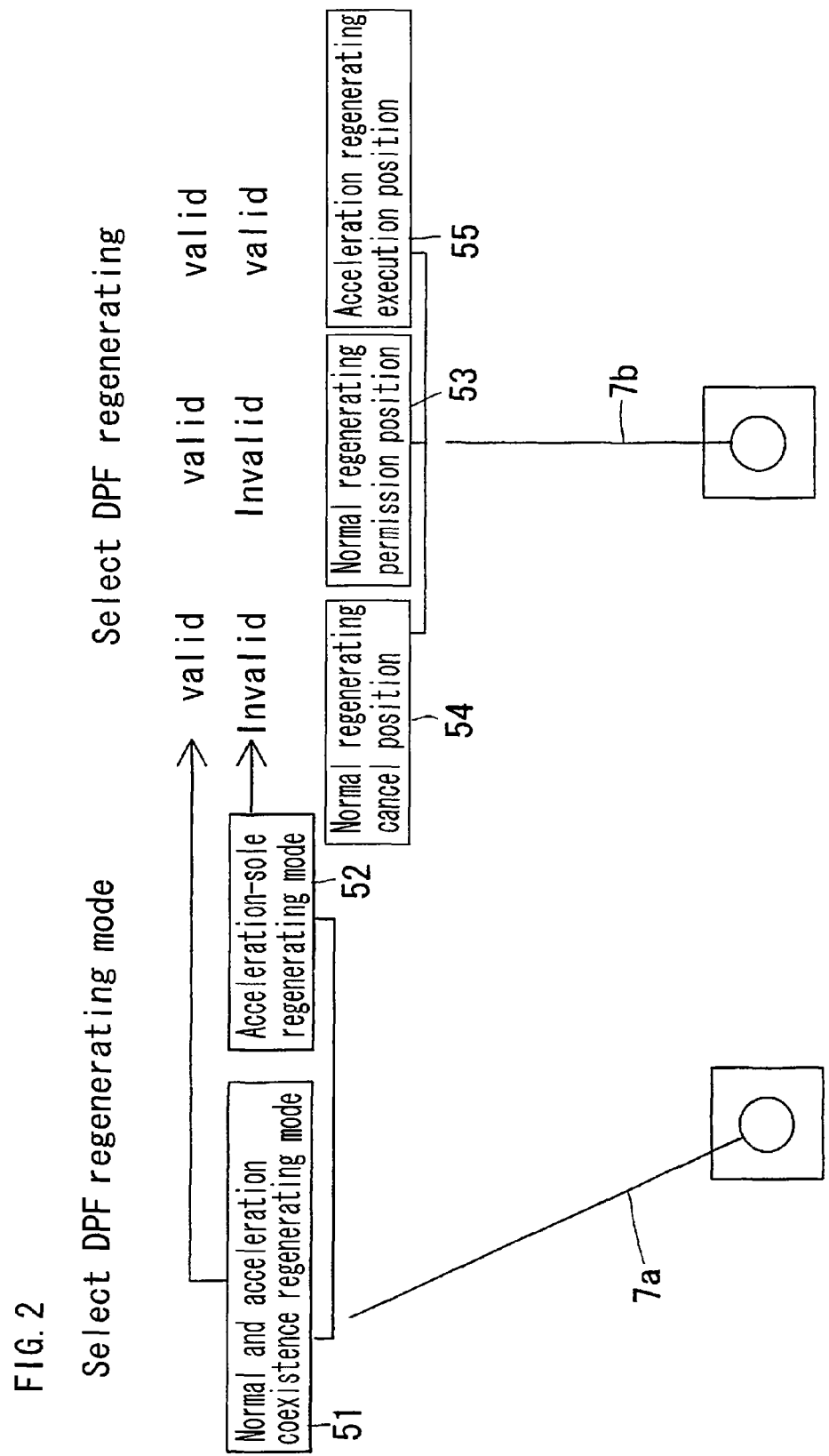
FIG. 2 is a diagram showing a relationship between the DPF regenerating mode switch manipulation and the DPF regenerating selection manipulation of the exhaust treatment device of a diesel engine according to an embodiment of the present invention.

As shown in FIG. 2, the DPF regenerating mode switch manipulation means 7a can switch a DPF regenerating mode to a normal and acceleration coexistence regenerating mode 51 and an acceleration-sole regenerating mode 52.

The DPF regenerating selection manipulation means 7b switches a position to a normal regenerating permission position 53, a normal regenerating cancel position 54, or an acceleration regenerating execution position 55.

When the DPF regenerating mode switch manipulation means 7a switches the DPF regenerating mode to the normal and acceleration coexistence regenerating mode 51, all instructions (that is, a normal regenerating permission instruction, a normal regenerating cancel instruction, and an acceleration regenerating execution instruction) based on positions 53, 54, and 55 selected by the DPF regenerating selection manipulation means 7b are valid.

As shown in FIG. 3, when the normal regenerating permission position 53 is selected in the normal and acceleration coexistence regenerating mode 51, after a PM accumulation estimation value rises up to the normal regenerating start determination value J3, the DPF regenerating control means 4 automatically controls the DPF regenerating means 3 so that it starts executing (S4) the normal regenerating processing, thereby raising the temperature of the exhaust 11 passing through the DPF 1.

Next, if the PM accumulation estimation value is equal to or higher than an acceleration regenerating request determination value (J2) when an acceleration regenerating request is determined (T3) after the PM accumulation estimation value rises up to the normal regenerating start determination value J3, the DPF regenerating control means 4 controls the acceleration regenerating request information notification means 6 so that it notifies (S11) acceleration regenerating request information.

Next, when the acceleration regenerating execution position 55 is selected in the normal and acceleration coexistence regenerating mode 51, the DPF regenerating control means 4 controls the DPF regenerating means 3 so that it switches (S13) the normal regenerating processing to acceleration regenerating processing so that acceleration regenerating is executed (S30). Accordingly, the temperature of the exhaust 11 passing through the DPF 1 rises, and thus the regenerating speed of the DPF 1 is accelerated as compared with the normal regenerating processing.

When the normal regenerating cancel position 54 is selected during the time for which the normal regenerating processing is executed (S4, S16) in the normal and acceleration coexistence regenerating mode 51, the DPF regenerating control means 4 controls the DPF regenerating means 3 so that it prohibits (S8) the execution of the normal regenerating processing by canceling the execution of the normal regenerating processing (S4, S16).

As shown in FIG. 2, when the DPF regenerating mode switch manipulation means 7a switches the DPF regenerating mode to the acceleration-sole regenerating mode 52, even after a PM accumulation estimation value rises up to the normal regenerating start determination value J3 irrespective of a position selected by the DPF regenerating selection manipulation means 7b, the DPF regenerating control means 4 controls the DPF regenerating means 3 so that it prohibits (S8) the normal regenerating processing, thereby not starting executing (S4) the normal regenerating processing. If the PM accumulation estimation value is equal to or higher than the acceleration regenerating request determination value J2 when the acceleration regenerating request is determined (T3) after the PM accumulation estimation value rises up to the normal regenerating start determination value J3, the DPF regenerating control means 4 controls the acceleration regenerating request information notification means 6 so that it notifies (S11) acceleration regenerating request information.

When the DPF regenerating selection manipulation means 7b selects the acceleration regenerating execution position in the acceleration-sole regenerating mode 52, the acceleration regenerating execution instruction based on the selection is valid. However, when the normal regenerating permission position 53 is selected, the normal regenerating permission instruction based on the selection is invalid. Furthermore, when the normal regenerating cancel position 54 is selected, the normal regenerating cancel instruction based on the selection is also invalid.

Next, when the acceleration regenerating execution positions 55 is selected in the acceleration-sole regenerating mode 52, the DPF regenerating control means 4 raises the temperature of the exhaust 11 passing through the DPF 1 by starting executing the acceleration regenerating processing. Accordingly, the regenerating speed of the DPF 1 is accelerated as compared with the normal regenerating processing in the normal and acceleration coexistence regenerating mode 51.

Next, when the selection of the acceleration regenerating execution position 55 is released in the acceleration-sole regenerating mode 52, the DPF regenerating control means 4 controls the DPF regenerating means 3 so that it prohibits (S33) the acceleration regenerating processing.

Here, the DPF regenerating control means 4 controls the DPF regenerating means 3 so that it switches (S13) the continued prohibition (S8, S21) of the normal regenerating processing to the acceleration regenerating processing, so that the acceleration regenerating processing is started.

As compared with the normal regenerating processing, in the acceleration regenerating processing, the amount of injection in the main injection or the post injection is increased in order to raise the temperature of the exhaust 11 and accelerate the regenerating speed of the DPF 1.

As shown in FIG. 2, the acceleration regenerating request information notification means 6 is a lamp installed in the dashboard of a machine having the diesel engine mounted thereon. The acceleration regenerating request information is notified (S11) by keeping turning on the lamp.

Both the DPF regenerating mode switch manipulation means 7a and the DPF regenerating selection manipulation means 7b are manipulation levers installed in the dashboard. When a driver, etc. switches the manipulation levers, the DPF regenerating mode and the DPF regenerating selection position are selected.

In FIG. 1, a reference numeral 41 represents a lamp which is normal regenerating notification means installed in the dashboard. The execution of normal regenerating processing is notified by keeping turning on the lamp, and the cancel of normal regenerating processing is notified by turning on and off the lamp.

As shown in FIG. 3, in the case where the determination reservation period T1 of an acceleration regenerating request is stored in the memory means 5, the normal regenerating start determination value J3 is set to be higher than the acceleration regenerating request determination value J2, and the DPF regenerating mode switch manipulation means 7a switches the DPF regenerating mode to the normal and acceleration coexistence regenerating mode 51, a point of time at which the acceleration regenerating request is determined (T3) is a point of time when the determination reservation period (T1) of the acceleration regenerating request elapses in the state in which the normal regenerating processing is not finished (S7) after the PM accumulation estimation value rises up to the normal regenerating start determination value J3.

As shown in FIG. 3, when the DPF regenerating mode switch manipulation means 7a switches the DPF regenerating mode to the acceleration-sole regenerating mode 52, a point of time at which an acceleration regenerating request is determined (T3) is a point of time when the determination reservation period T1 of an acceleration regenerating request elapses in the state in which the normal regenerating processing is prohibited (S8) after a PM accumulation estimation value rises up to the normal regenerating start determination value J3.

As shown in FIG. 3, in the case where the re-determination period T2 of an acceleration regenerating request is stored in the memory means 5 and the DPF regenerating mode switch manipulation means 7a switches the DPF regenerating mode to the normal and acceleration coexistence regenerating mode 52, if a PM accumulation estimation value is smaller than the acceleration regenerating request determination value J2 when the acceleration regenerating request is determined (T3), the DPF regenerating control means 4 continues to execute (S16) the normal regenerating processing S16 even after the re-determination period T2 of the acceleration regenerating request is entered after the acceleration regenerating request is determined (T3). Consequently, if the PM accumulation estimation value rises up to the acceleration regenerating request determination value J2 during the re-determination period T2 of the acceleration regenerating request, the DPF regenerating control means 4 controls the acceleration regenerating request information notification means 6 so that it notifies (S11) acceleration regenerating request information.

In the case where a point of time when the re-determination period T2 of an acceleration regenerating request elapses is a point of time at which re-determination is finished (T4) and a DPF accumulation estimation value has not risen up to the acceleration regenerating request determination value J2 when the re-determination is finished (T4), the DPF regenerating control means 4 finishes (S19) the normal regenerating processing.

As shown in FIG. 3, in the case where the DPF regenerating control means 4 controls the DPF regenerating means 3 so that it executes (S30) acceleration regenerating processing, if a PM accumulation estimation value drops to the acceleration regenerating request determination value J2 which is the lowest limit value of an acceleration regenerating request, the DPF regenerating control means 4 finishes (S25) the acceleration regenerating processing.

In the case where DPF abnormal information notification means 8 is included as shown in FIG. 1 and a DPF abnormal determination value J4 higher than the acceleration regenerating request determination value J2 or the normal regenerating start determination value J3 is stored in the memory means 5 as shown in FIG. 3, if a PM accumulation estimation value rises up to the DPF abnormal determination value J4, the DPF regenerating control means 4 controls the DPF abnormal information notification means 8 so that it notifies (S32) DPF abnormal information.

The DPF abnormal information notification means 8 is a lamp installed in the dashboard, and the DPF abnormal information is notified by keeping turning on the lamp.

In the case where the normal regenerating end determination value J1 lower than the normal regenerating start determination value J3 or the acceleration regenerating request determination value J2 is stored in the memory means 5 as shown in FIG. 3 and the DPF regenerating mode switch manipulation means 7a switches the DPF regenerating mode to the normal and acceleration coexistence regenerating mode 51, if a PM accumulation estimation value drops to the normal regenerating end determination value J1 through normal regenerating processing, the DPF regenerating control means 4 finishes (S7, S19) the normal regenerating processing.

The normal regenerating processing is performed during the operation of a machine having an engine mounted thereon, in which at least one of the traveling of the machine and a task for the machine is performed, and the acceleration regenerating processing is performed during the stop of a machine having an engine mounted thereon, in which both the traveling of the machine and a task for the machine are stopped.

For example, in a farming tractor pulling a rotary, the normal regenerating processing is performed during the operation of a machine in which traveling or a cultivation task is performed, and the acceleration regenerating processing is performed during the stop of a machine in which both traveling and a cultivation task are stopped.

If three kinds of conditions are satisfied in which the shift lever 45 for changing the speed of an automatic transmission is placed in the neutral position, the RPM of the engine is in the idle rotation region, and a side brake 46 is pulled over while the engine is operated, the control means 14 determines that the machine is not operating based on the three conditions detected by sensors. If any one of the three conditions is not satisfied while the engine is operated, the control means 14 determines that the machine is operating.

If two (that is, the shift lever 45 for changing the speed of an automatic transmission is placed in the neutral position and the RPM of the engine is in the idle rotation region) of the three conditions are satisfied, the control means 14 determines that the machine is not operating based on the two conditions detected by sensors. If any one of the two conditions is not satisfied while the engine is operated, the control means 14 may determine that the machine is operating.

A flow of regenerating processing according to the engine ECU (that is, the control means) is described below.

Figure 4:
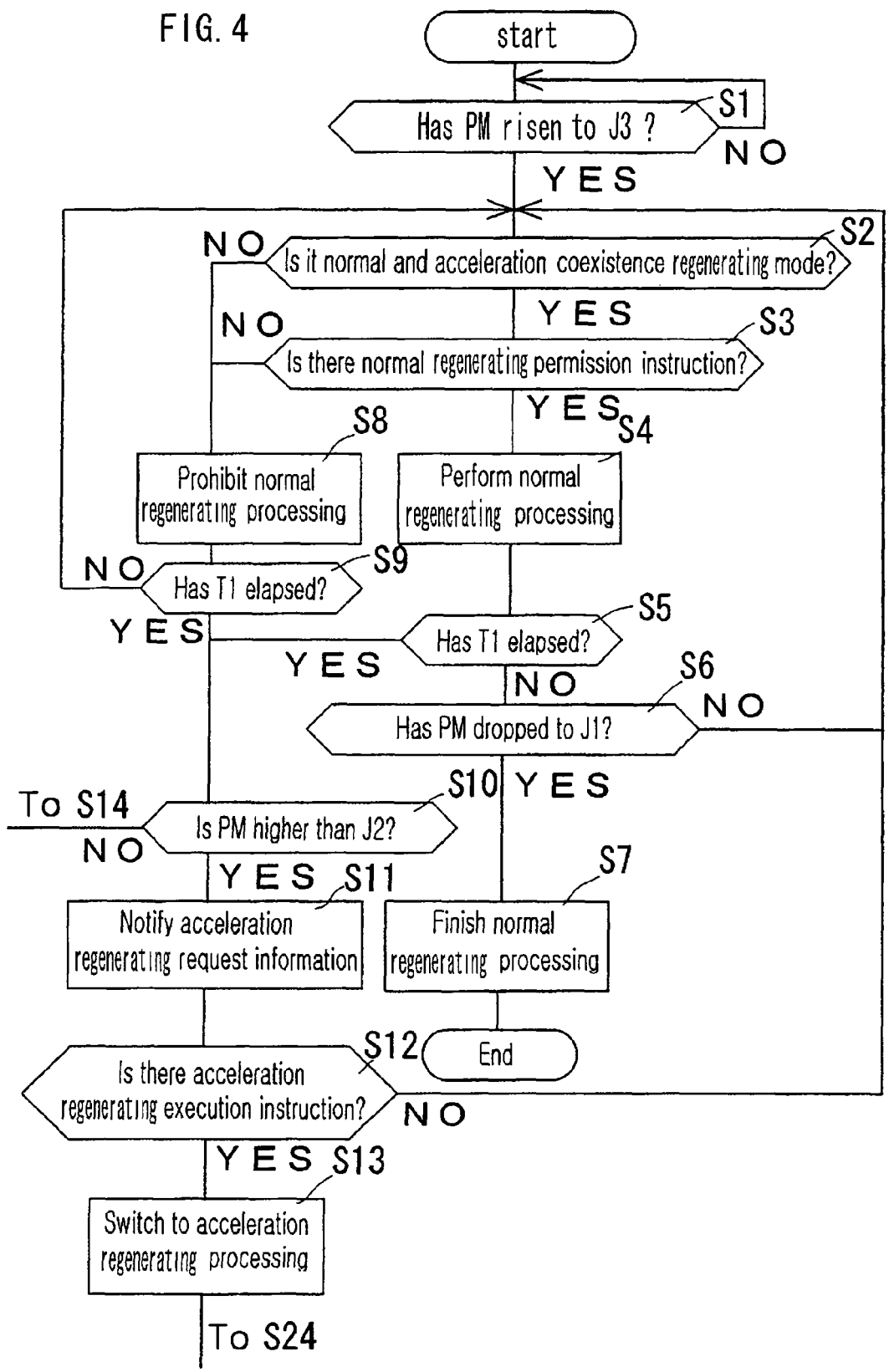
FIG. 4 shows part of a flowchart of regenerating processing using the exhaust treatment device of a diesel engine according to an embodiment of the present invention.

As shown in FIG. 4, at step S1, whether a PM accumulation estimation value of the DPF 1 has risen to the normal regenerating start determination value J3 is determined. If, as a result of the determination, the PM accumulation estimation value of the DPF 1 is determined to have risen to the normal regenerating start determination value J3, whether the normal and acceleration coexistence regenerating mode has been selected is determined at step S2. If, as a result of the determination at step S2, the normal and acceleration coexistence regenerating mode is determined to have been selected, whether there is a normal regenerating permission instruction is determined at step S3. If, as a result of the determination at step S3, the normal regenerating permission instruction is determined to exist, normal regenerating processing is executed at step S4. Next, whether the determination reservation period T1 of an acceleration regenerating request has elapsed is determined at step S5. If, as a result of the determination at step S5, the determination reservation period T1 of the acceleration regenerating request is determined not to have elapsed, whether the PM accumulation estimation value of the DPF 1 has dropped to the normal regenerating end determination value J1 is determined at step S6. If, as a result of the determination at step S6, the PM accumulation estimation value of the DPF 1 is determined to have dropped to the normal regenerating end determination value J1, the normal regenerating processing is finished at step S7. If, as a result of the determination at step S6, the PM accumulation estimation value of the DPF 1 is determined not to have dropped to the normal regenerating end determination value J1, the process returns to step S2.

If, as a result of the determination at step S2, the normal and acceleration coexistence regenerating mode is determined not to have been selected (that is, when the acceleration-sole regenerating mode is selected) or if, as a result of the determination at step S3, the normal regenerating permission instruction is determined not to exist (that is, when the normal regenerating permission instruction does not exist in the normal and acceleration coexistence regenerating mode), the normal regenerating processing is prohibited at step S8. Next, whether the determination reservation period T1 of an acceleration regenerating request has elapsed is determined at step S9. If, as a result of the determination at step S9, the determination reservation period T1 of the acceleration regenerating request is determined to have elapsed, whether the PM accumulation estimation value of the DPF 1 is the acceleration regenerating request determination value J2 or higher is determined at step S10. Even when the determination reservation period T1 of the acceleration regenerating request is determined to have elapsed at step S5, whether the PM accumulation estimation value of the DPF 1 is the acceleration regenerating request determination value J2 or higher is determined at step S10. If, as a result of the determination at step S10, the PM accumulation estimation value of the DPF 1 is determined to be the acceleration regenerating request determination value J2 or higher, acceleration regenerating request information is notified at step S11. Next, whether an acceleration regenerating execution instruction exists is determined at step S12. If, as a result of the determination at step S12, the acceleration regenerating execution instruction is determined to exist, the execution of the normal regenerating processing at step S4 or the prohibition of the normal regenerating processing at step S8 is switched to acceleration regenerating processing at step S13. Accordingly, the acceleration regenerating processing is started. If, as a result of the determination at step S12, the acceleration regenerating execution instruction is determined not to exist, the process returns to step S2.

Figure 5:
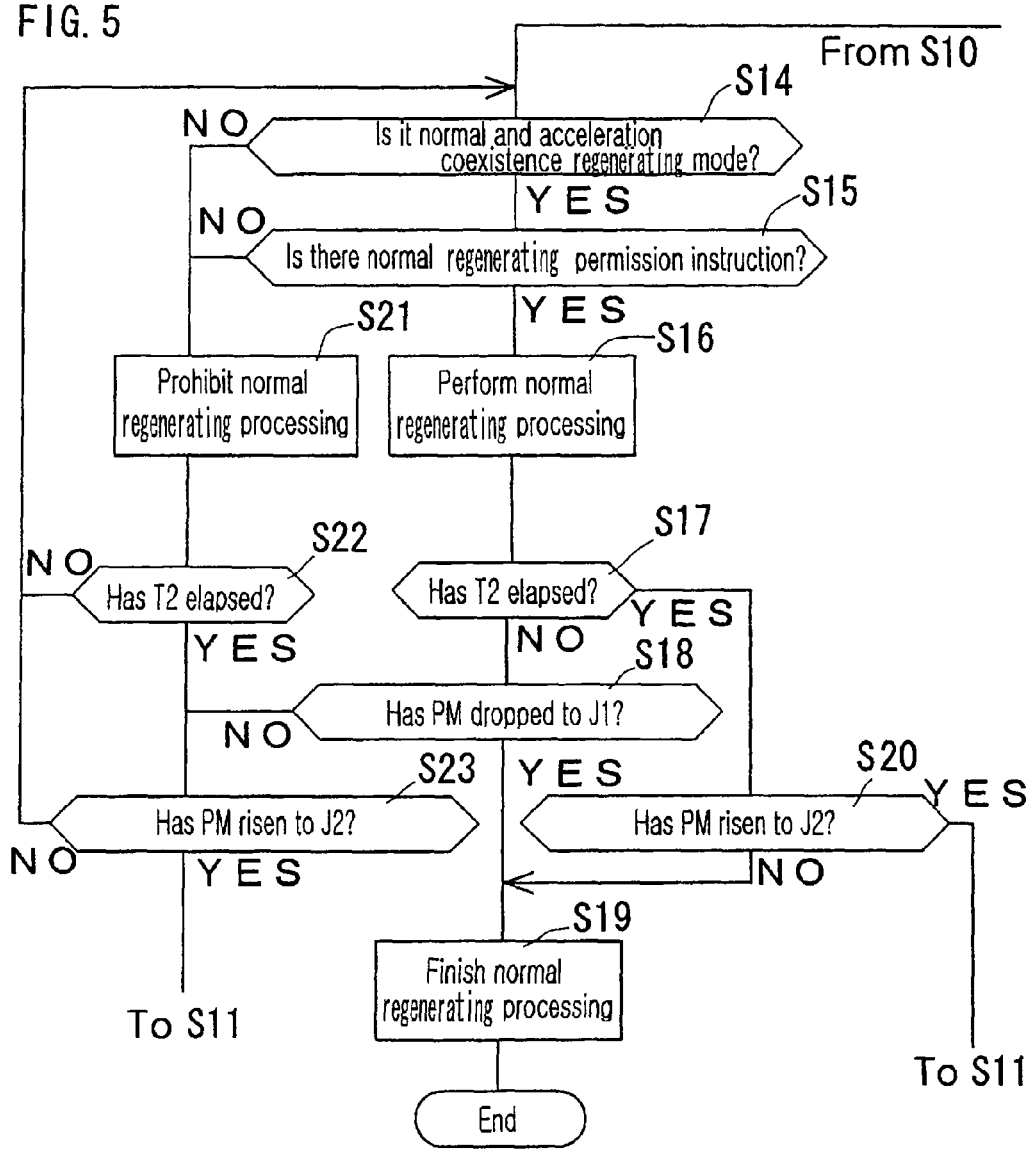
FIG. 5 shows a portion continued from step S10 in the flowchart shown in FIG. 4.

If, as a result of the determination at step S10, the PM accumulation estimation value of the DPF 1 is determined not to be the acceleration regenerating request determination value J2 or higher, whether the normal and acceleration coexistence regenerating mode has been selected is determined at step S14, as shown in FIG. 5. If, as a result of the determination at step S14, the normal and acceleration coexistence regenerating mode is determined to have been selected, whether a normal regenerating permission instruction exists is determined at step S15. If, as a result of the determination at step S15, the normal regenerating permission instruction is determined to exist, the normal regenerating processing is executed at step S16. Next, whether the re-determination period T2 of the acceleration regenerating request has elapsed is determined at step S17. If, as a result of the determination at step S17, the re-determination period T2 of the acceleration regenerating request is determined not to have elapsed, whether the PM accumulation estimation value has dropped to the normal regenerating end determination value J1 is determined at step S18. If, as a result of the determination at step S18, the PM accumulation estimation value is determined to have dropped to the normal regenerating end determination value J1, the normal regenerating processing is finished at step S19. If, as a result of the determination at step S17, the re-determination period T2 of the acceleration regenerating request is determined to have elapsed, whether the PM accumulation estimation value has risen to the acceleration regenerating request determination value J2 is determined at step S20. If, as a result of the determination at step S20, the PM accumulation estimation value is determined not to have risen to the acceleration regenerating request determination value J2, the process proceeds to step S19. If, as a result of the determination at step S20, the PM accumulation estimation value is determined to have risen to the acceleration regenerating request determination value J2, the process returns to step S11.

If, as a result of the determination at step S14, the normal and acceleration coexistence regenerating mode is determined not to have been selected (that is, when the acceleration-sole regenerating mode is selected) or if, as a result of the determination at step S15, the normal regenerating permission instruction is determined not to exist (that is, when there is no normal regenerating permission instruction in the normal and acceleration coexistence regenerating mode), the normal regenerating processing is prohibited at step S21. Next, whether the re-determination period T2 of the acceleration regenerating request has elapsed is determined at step S22. If, as a result of the determination at step S22, the re-determination period T2 of the acceleration regenerating request is determined to have elapsed, whether the PM accumulation estimation value is the acceleration regenerating request determination value J2 or higher is determined at step S23. If, as a result of the determination at step S23, the PM accumulation estimation value is determined to be the acceleration regenerating request determination value J2 or higher, the process returns to step S11. Even when the PM accumulation estimation value is determined not to have dropped to the normal regenerating end determination value J1 at step S18, the process proceeds to step S23. If, as a result of the determination at step S22, the re-determination period T2 of the acceleration regenerating request is determined not to have elapsed or if, as a result of the determination at step S23, the PM accumulation estimation value is determined not to be the acceleration regenerating request determination value J2 or higher, the process returns to step S14.

As shown in FIG. 6, whether the PM accumulation estimation value has dropped to the acceleration regenerating request determination value J2 is determined at step S24. If, as a result of the determination at step S24, the PM accumulation estimation value is determined to have dropped to the acceleration regenerating request determination value J2, the acceleration regenerating processing is finished at step S25. Next, the notification of the acceleration regenerating request information is finished at step S26. If, as a result of the determination at step S24, the PM accumulation estimation value is determined not to have dropped to the acceleration regenerating request determination value J2, whether the normal and acceleration coexistence regenerating mode has been selected is determined at step S27. If, as a result of the determination at step S27, the normal and acceleration coexistence regenerating mode is determined to have been selected, whether a normal regenerating permission instruction exists is determined at step S28. If, as a result of the determination at step S28, the normal regenerating permission instruction is determined not to exist, whether an acceleration regenerating execution instruction exists is determined at step S29. If, as a result of the determination at step S29, the acceleration regenerating execution instruction is determined to exist, the acceleration regenerating processing is executed at step S30. Next, whether the PM accumulation estimation value of the DPF 1 has risen to the DPF abnormal determination value J4 is determined at step S31. If, as a result of the determination at step S31, the PM accumulation estimation value of the DPF 1 is determined to have risen to the DPF abnormal determination value J4, DPF abnormal information is notified at step S32. If, as a result of the determination at step S31, the PM accumulation estimation value of the DPF is determined not to have risen to the DPF abnormal determination value J4, the process returns to step S24. If, as a result of the determination at step S27, the normal and acceleration coexistence regenerating mode is determined not to have been selected, the process proceeds to step S29. If, as a result of the determination at step S28, the normal regenerating permission instruction is determined to exist, the process proceeds to step S16. If, as a result of the determination at step S29, the acceleration regenerating execution instruction is determined not to exist, the acceleration regenerating processing is prohibited at step S33, and the process proceeds to step S31.

DESCRIPTION OF REFERENCE NUMERALS

1: DPF
1a: cell
1b: wall
2: PM accumulation estimation means
3: DPF regenerating means
4: DPF regenerating control means
5: memory means
6: acceleration regenerating request information notification means
7a: DPF regenerating mode switch manipulation means
7b: DPF regenerating selection manipulation means
8: DPF abnormal information notification means
9: common rail system
10: DOC
11: exhaust
51: normal and acceleration coexistence regenerating mode
52: acceleration-sole regenerating mode
53: normal regenerating permission position
54: normal regenerating cancel position
55: acceleration regenerating execution position
J1: normal regenerating end determination value
J2: acceleration regenerating request determination value
J3: normal regenerating start determination value
J4: DPF abnormal determination value
T1: determination reservation period of acceleration regenerating request
T2: re-determination period of acceleration regenerating request
T3: When acceleration regenerating request is determined
T4: When re-determination is finished
S4: Execute normal regenerating processing
S7: Finish normal regenerating processing
S8: Prohibit normal execution processing
S11: Notify acceleration regenerating request information
S13: Switch to acceleration regenerating processing
S16: Execute normal regenerating processing
S19: Finish normal regenerating processing
S21: Prohibit normal execution processing
S25: Finish acceleration regenerating processing
S32: Notify DPF abnormal information

The invention claimed is:
1. An exhaust treatment device of a diesel engine, comprising:
a DPF (1), PM accumulation estimation means (2) for PM accumulated in the DPF (1), DPF regenerating means (3), DPF regenerating control means (4), memory means (5), acceleration regenerating request information noti- fication means (6), DPF regenerating mode switch manipulation means (7a), and DPF regenerating selection manipulation means (7b), wherein a predetermined acceleration regenerating request determination value (J2) and a predetermined normal regenerating start determination value (J3) are stored in the memory means (5), wherein the DPF regenerating control means (4) is configured to control the DPF regenerating mode switch manipulation means (7a) to switches a DPF regenerating mode to a normal and acceleration coexistence regenerating mode (51) or an acceleration-sole regenerating mode (52), and to control the DPF regenerating selection manipulation means (7b) to switches a position to a normal regenerating permission position (53), a normal regenerating cancel position (54), or an acceleration regenerating execution position (55), such that if the DPF regenerating mode is in the normal and acceleration coexistence regenerating mode (51) and the normal regenerating permission position (53) is selected, after a PM accumulation estimation value rises to the predetermined normal regenerating start determination value (J3), the DPF regenerating control means (4) automatically controls the DPF regenerating means (3) so that the DPF regenerating means (3) starts executing (S4) normal regenerating processing, thereby raising a temperature of exhaust (11) passing through the DPF (1), and when the PM accumulation estimation value is the predetermined acceleration regenerating request determination value (J2) or higher in determining a subsequent acceleration regenerating request, the DPF regenerating control means (4) controls the acceleration regenerating request information notification means (6) so that the acceleration regenerating request information notification means (6) notifies (S11) acceleration regenerating request information, when the acceleration regenerating execution position (55) is then selected in the normal and acceleration coexistence regenerating mode (51), the DPF regenerating control means (4) controls the DPF regenerating means (3) so that the DPF regenerating means (3) switches (S13) the normal regenerating processing to acceleration regenerating processing, thereby raising the temperature of the exhaust (11) passing through the DPF (1) and accelerating a regenerating speed of the DPF (1) as compared with the normal regenerating processing, if the normal regenerating cancel position 54 is selected while the normal regenerating processing is executed (S4, S 16) in the normal and acceleration coexistence regenerating mode (51), the DPF regenerating control means (4) cancels the execution (S4, S 16) of the normal regenerating processing by the DPF regenerating means (3) and prohibits (S8) the execution of the normal regenerating processing, and if the DPF regenerating mode is in the acceleration-sole regenerating mode (52), the DPF regenerating control means (4) prohibits (S8) the normal regenerating processing by the DPF regenerating means (3), irrespective of a position selected by the DPF regenerating selection manipulation means (7b), and when the PM accumulation estimation value is the predetermined acceleration regenerating request determination value (J2) or higher in determining the acceleration regenerating request, the DPF regenerating control means (4) controls the acceleration regenerating request information notification means (6) so that the acceleration regenerating request information notification means (6) notifies (S 11) the acceleration regenerating request information, and when the acceleration regenerating execution position (55) is then selected in the acceleration-sole regenerating mode (52), the DPF regenerating control means 4 starts the acceleration regenerating processing, and when the selection of the acceleration regenerating execution position (55) is then released in the acceleration-sole regenerating mode (52), the DPF regenerating control means (4) prohibits (S33) the acceleration regenerating processing by the DPF regenerating means (3).

2. The exhaust treatment device according to claim 1, wherein the DPF regenerating control means (4) is further configured such that:

a determination reservation period (T1) of the acceleration regenerating request is stored in the memory means (5), and the predetermined normal regenerating start determination value (J3) is set to be higher than the predetermined acceleration regenerating request determination value (J2), and when the DPF regenerating mode switch manipulation means (7a) switches the DPF regenerating mode to the normal and acceleration coexistence regenerating mode (51), and a point of time at which the acceleration regenerating request is determined (T3) is a point of time at which the determination reservation period (T1) of the acceleration regenerating request has elapsed without finishing (S7) the normal regenerating processing after the PM accumulation estimation value rises to the normal regenerating start determination value J3.

3. The exhaust treatment device according to claim 2, wherein the DPF regenerating control means (4) is further configured such that:

a re-determination period (T2) of the acceleration regenerating request is stored in the memory means (5), and when the DPF regenerating mode switch manipulation means (7a) switches the DPF regenerating mode to the normal and acceleration coexistence regenerating mode (52), if the PM accumulation estimation value is lower than the predetermined acceleration regenerating request determination value (J2) when the acceleration regenerating request is determined (T3), even after the re-determination period (T2) of the acceleration regenerating request after the acceleration regenerating request is determined (T3) is entered, the DPF regenerating control means (4) continues to execute (S 16) the normal regenerating processing, and if the PM accumulation estimation value rises up to the predetermined acceleration regenerating request determination value (J2) during the re-determination period (T2) of the acceleration regenerating request, the DPF regenerating control means (4) controls the acceleration regenerating request information notification means 6 so that the acceleration regenerating request information notification means 6 notifies (S 11) the acceleration regenerating request information, and a point of time at which the re-determination period (T2) of the acceleration regenerating request has elapsed is a point of time when re-determination is finished (T4), and if the DPF accumulation estimation value does not rise to the predetermined acceleration regenerating request determination value (J2) when the re-determination is finished (T4), the DPF regenerating control means (4) finishes (S 19) the normal regenerating processing.

4. The exhaust treatment device according to claim 1, wherein the DPF regenerating control means (4) is further configured such that in the case where the DPF regenerating control means (4) executes (S30) the acceleration regenerating processing through the DPF regenerating means (3), if the PM accumulation estimation value drops to the predetermined acceleration regenerating request determination value (J2) which is a lowest limit value of the acceleration regenerating request, the DPF regenerating control means (4) finishes (S25) the acceleration regenerating processing.

5. The exhaust treatment device according to claim 1, further comprising DPF abnormal information notification means 8, and wherein the DPF regenerating control means (4) is further configured such that:
   a predetermined DPF abnormal determination value (J4), higher than the predetermined acceleration regenerating request determination value J2 or the predetermined normal regenerating start determination value (J3), is stored in the memory means (5), and
   when the PM accumulation estimation value rises to the predetermined DPF abnormal determination value (J4), the DPF regenerating control means (4) controls the DPF abnormal information notification means (8) so that the DPF abnormal information notification means (8) notifies (S32) DPF abnormal information.

6. The exhaust treatment device according to claim 1, wherein the DPF regenerating control means (4) is further configured such that:
   a predetermined normal regenerating end determination value (J1) lower than the predetermined normal regenerating start determination value (J3) or the predetermined acceleration regenerating request determination value (J2) is stored in the memory means (5), and
   in case where the DPF regenerating mode switch manipulation means (7*a*) switches the DPF regenerating mode to the normal and acceleration coexistence regenerating mode (51), when the PM accumulation estimation value drops to the predetermined normal regenerating end determination value (J1) through the normal regenerating processing, the DPF regenerating control means (4) finishes (S7, S19) the normal regenerating processing.

7. The exhaust treatment device according to claim 1, wherein the DPF regenerating control means (4) is further configured such that:
   the normal regenerating processing is performed during an operation of a machine having an engine mounted thereon, in which at least one of the traveling of the machine and a task for the machine is performed, and
   the acceleration regenerating processing is performed during a stop of a machine having an engine mounted thereon, in which both the traveling of the machine and a task for the machine are stopped.

8. The exhaust treatment device according to claim 1, wherein:
   the DPF regenerating means (3) has a combination of a common rail system (9) and a DOC (10) disposed upstream of the DPF (1), and
   in the normal regenerating processing and the acceleration regenerating processing, non-combustion fuel is mixed with the exhaust by means of a post injection subsequent to a main injection performed by injectors (27) of the common rail system (9), and the non-combustion fuel is oxidized and combusted by oxygen within the exhaust using the DOC (10), thereby raising the temperature of the exhaust passing through the DPF (1).

\* \* \* \* \*